Dec. 26, 1961  H. E. BRAGG  3,014,402
RECORDING AND REPRODUCING OF PICTURES ENHANCING
THE ILLUSION OF REALISM
Filed March 23, 1953
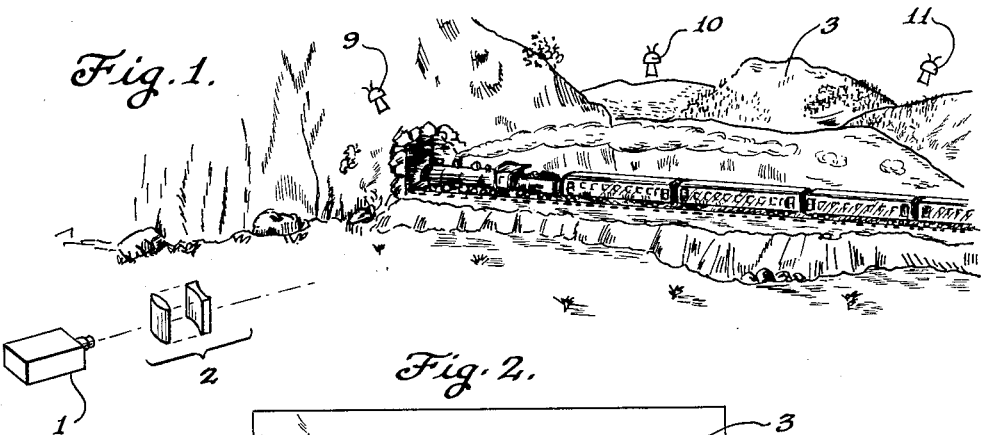
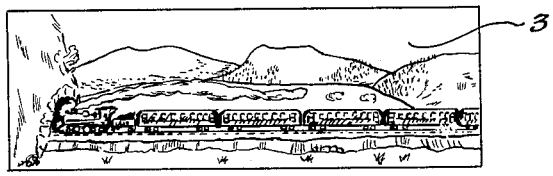
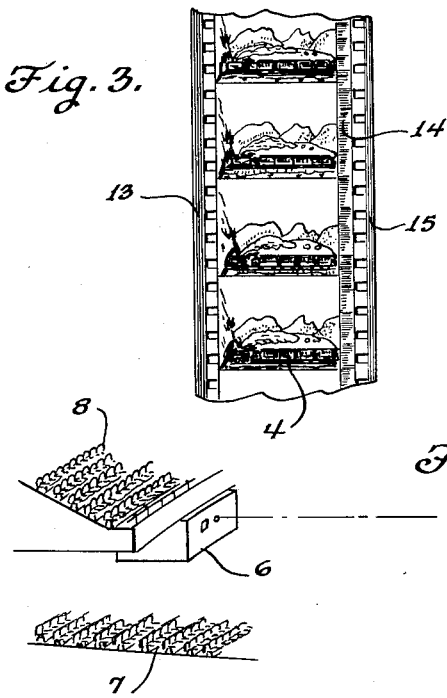
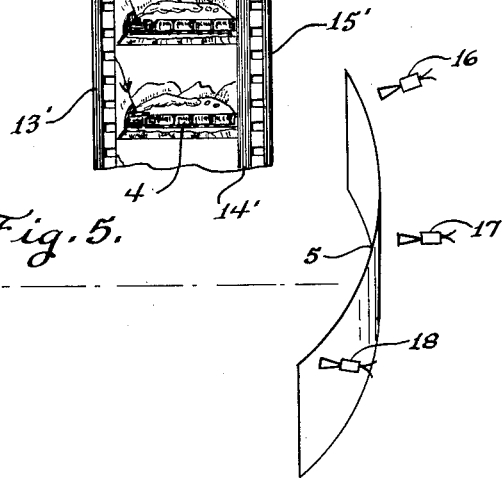
INVENTOR.
HERBERT E. BRAGG
BY
ATTORNEY

United States Patent Office 3,014,402
Patented Dec. 26, 1961

3,014,402
RECORDING AND REPRODUCING OF PICTURES ENHANCING THE ILLUSION OF REALISM
Herbert E. Bragg, Mansfield Township, Warren County, N.J., assignor to Twentieth Century Fox Film Corporation, New York, N.Y., a corporation of New York
Filed Mar. 23, 1953, Ser. No. 344,081
2 Claims. (Cl. 88—16.2)

This invention relates to the taking and projecting of pictures in motion and is particularly concerned with such taking and projecting, whether it be by motion pictures through photographic means, or by television, particularly of the large screen type, wherein an approach to, or an illusion of, realism is materially enhanced. In the arts of producing and presenting motion pictures, it has long been the desire to achieve a medium which would portray drama, action, scenes, and events, with the same degree of realism as a viewer would see the actual scenes, and events, and people, were he actually present on the spot. The same desire is present in connection with the portrayal of television images in the projection of the same upon large screens.

This has never been completely achieved practically. Many workers in the art have experimented over the years, employing a variety of devices and techniques and have followed many different paths in seeking a solution. Partial solutions have been achieved, but some obstacle has always prevented the achieving of a complete solution and, accordingly, real commercial success. For the sake of a full understanding of the problem, a review of some of the approaches to a solution which together form the body of knowledge available to those skilled in the motion picture arts will be set forth.

The mechanism of seeing—the human eye—is a complex and wonderful mechanism; so much has been written on the subject that only a few pertinent points need be considered here. First, each eye is able to focus on any object that forms the center of interest; second, the amount of illumination entering each eye can be controlled over wide limits; the angle of view, i.e., the space which the eye perceives at one and the same time, is large—of the order of 150° horizontally, and 90° vertically—; again the two eyes, as they focus on an object are automatically turned toward each other so that the optic axes converge on the center of interest; and lastly, each eye sees a view of an object slightly different from that perceived by the other. There are other more involved and profound psycho-physical aspects of the reception of the stimuli which result in "seeing." Among them are relative motion within the visual field; "color" differences; brightness relations; detail size and distribution.

Some workers in the art have sought to achieve a solution to the problem with which this invention is concerned by providing two cameras—or the equivalent—and making two separate pictures, which may then by appropriate means be viewed in such a manner that each eye sees the picture taken by the camera in the same relative position as would each of a person's two eyes, were they in the same position as the camera. These are the so-called "stereo" techniques, and, properly executed, can result in a remarkable sense of realism as far as the feeling of relative placement in space and "roundness" or "solidity" of objects is concerned. These methods fall short of the ideal, however, in their restrictions in the extent of the object space that can be viewed at any one time. The angle of view is limited by practical considerations—it seems like peering out a relatively small window. One of the most serious practical obstacles so far has been the requirements for much more illumination—more powerful light sources—or more efficient screens than were heretofore available.

Other workers in the art have sought a solution by turning to wider films. They solve the problem of providing a satisfactory angular view with better perspective—another way of expressing improved illusion of depth in a picture. Though the use of wider film solved one part of the problem, it only did so on a laboratory basis. Commercially the practical and economic aspects of converting already equipped theatres from the use of standard width film to a wider film presents an insuperable problem.

Also, in the use of wider films, as in the other proposed solutions to the problem, the problem of getting sufficient light on the screen uniformly distributed to produce a satisfactory picture has not yet been overcome. There have been proposals to use a multiplicity of light sources with several matching films, or individual light sources of increased brightness. Providing a number of light sources by means of several projectors used together is unwieldly and costly and they are too difficult to maintain in registry to be practical for normal theatre operation. Increasing the intensity of light from a single source inevitably produces more heat along with it and the increased heat causes damage to the film.

This invention and the combination and method involved therein, enables the presentation of motion pictures involving a degree of realism going far beyond anything heretofore achieved through the work just referred to, or as a result of any other known work in the art. Nevertheless, the invention achieves its greatly improved result and in a manner fully acceptable to audiences viewing the picture and hearing the sound accompanying the same. The audiences are not inconvenienced by the necessity of having to wear polarizing, or differently colored glasses, as in the stereo techniques, while, at the same time, the object space that can be viewed is increased well towards that observed through normal vision. Nevertheless, the brightness of the picture is at least the same as that attainable from the regular prior art black and white projection. Sufficient illusion of realism is nevertheless achieved to bring about a feeling of audience participation, and to greatly enhance the entertainment value of the display.

From the economic standpoint, the invention enables the employment of existing motion picture projection equipment with merely a slight addition thereto which is capable of application and removal in the event it is desired to show films which have not been produced in accordance with the invention. Existing camera equipment can likewise be employed with moderate additions thereto. If, however, it is desired to employ modified camera equipment the expense is not such a factor, since the number of cameras employed in the taking of pictures is of little consequence compared to the number of existing projectors which would be used in the showing of prints of the original film. Again, if the original film is of such characteristics that changes in the images and image areas of it are needed to provide prints for use in existing projection equipment, the necessary changes can be made in the printing stage, again, an economical manner of proceeding.

The invention also makes provision for the recording and reproducing of sound existing in conjunction with the scene photographed in such a manner that the reproduction of the sound in conjunction with the showing of the picture assists in enhancing the illusion of realism.

It is, accordingly, the principal object of this invention to enhance the illusion of realism in the recording and reproducing of images of a scene in sequence.

Another object is to enhance such illusion in straightforward economical manner.

Still another object is to accompany the enhanced illusion of realism in its visual aspects with corresponding enhancement of sound aspects.

A further object is to achieve the foregoing objects without material alteration in existing projection apparatus.

A still further object is to provide motion pictures which achieve greatly enhanced illusion of realism without the necessity of furnishing any special equipment to be used by the audience.

A more detailed object is to provide standard width motion picture film and method combining a compressed picture image with stereophonic sound.

Further and more detailed objects of the invention will in part be pointed out and in part be obvious as the description of the invention and consideration of the accompanying drawing proceeds.

In that drawing:

FIGURE 1 is a schematic illustration of the taking of a motion picture in accordance with the invention.

FIGURE 2 is an illustration of a photographic recording of the scene depicted in FIGURE 1, retaining the dimensional relationships of FIGURE 1.

FIGURE 3 is a fragment of a motion picture film illustrating the photographic recording of the scene of FIGURE 2 compressed in one dimension in the photographing and accompanied by a plurality of sound tracks.

FIGURE 4 is a view similar to FIGURE 3 illustrating a different sound track arrangement; and FIGURE 5 is a diagrammatic illustration of the application of the system of the invention to a motion picture theatre for the projection of pictures in accordance with the invention.

The system and details of the invention furnish workable, practical and economical means yielding an entirely new medium of expression useful for presentation of motion pictures. As an illustration of one system embodying the invention and for carrying out the method thereof, a motion picture camera is shown diagrammatically at 1 in FIGURE 1, is equipped with a special lens attachment, here shown at 2, which lens attachment is of the nature of that disclosed in U.S. Patent No. 1,962,892 issued to Henry Chretien on June 12, 1934. Such attachments, depending upon the characteristics introduced into them, may increase the field of view of any camera objective with which they are used up to two times the normal field of such objective. This extended field is then recorded as a laterally compressed photographic image on a standard 35 mm. motion picture film. An image to be photographed in such manner is shown at 3 in FIG. 1 and as recorded on the film in compressed state at 4 in FIGURES 3 and 4.

This film can then be processed in either black and white, or in color, in standard manner and can then be projected employing a standard motion picture projector. Such projector is, however, additionally equipped with an anamorphotic lens attachment comparable to that employed on the camera. This operates to expand the image again to its original proportions in the projection of it on to the enlarged screen shown at 5 in FIGURE 5.

Since the pictures so presented on the screen are subtending an angular view substantially greater than that of the prior art motion pictures, the screen is preferably curved on a curvature approximately equal to the projection distance, or what is commonly called the "projection throw." That projection distance would here be the distance from the projector 6 of FIGURE 5 to the screen 5. The screen 5 as shown has its concaved side towards the projector.

Increased field of view in and of itself enhances the perspective and other aspects of the showing in a manner to create substantial illusion of realism, even though the screen be flat. This becomes marked once the increase in screen size reaches one and a half times that presently used, so that good results can be attained even in small or narrow theatres where there is only space to increase the screen width one and a half times and at that employing a flat screen. Increase in screen width beyond one and a half times the present standard (keeping the height substantially constant), further improves the illusion which is marked at 1.8 times and further heightened as the screen reaches twice the normal width, or even more than that. From a practical and economical standpoint, however, when the space allows for it, a screen width of two times that normally employed for the particular theatre appears to be the best practical solution. This yields a picture having an aspect ratio of 1:2.5 or slightly more, depending on the exact dimensions chosen for the film image. In addition, when it is economical to do so, it is desirable to curve the screen on a concave curvature whose radius is approximately equal to the projection thrown. This not only tends to still further heighten the illusion of realism but also improves the uniformity of distribution of light reflected from the screen to each seat in the theatre, which seats are illustrated at 7 and 8 in FIGURE 5.

Regarding the problem of screen illumination, the distribution of the light from the light source of standard existing projection equipment over screens of the sizes just referred to could not provide adequate illumination for a proper viewing of a picture so long as the screens used were those commonly encountered in the prior art. The intensity of the light sources cannot be increased, however, without damaging the film, so the problem has to be met in some other way. This problem is overcome in accordance with the invention, by employing a novel and highly reflective screen, as disclosed in the copending application of Yorick Gordon Hurd and Vaughn L. Agy, Serial No. 255,277, now abandoned, filed November 7, 1951 and owned by applicants' assignee. The panels of such screen are preferably joined in the manner disclosed in the application Serial No. 189,006 of Yorick Gordon Hurd and Herbert E. Bragg, filed October 7, 1950, now Patent No. 2,683,679 granted July 13, 1954 and Serial No. 229,904 in the names of Yorick Gordon Hurd and Ralph Delano Whitmore, filed June 5, 1951, now Patent No. 2,800,097 granted July 23, 1957.

Tests on such screen material have shown that light projected onto it is directed back toward the spectators in a manner to produce a picture approximately twice as bright as that which is capable of being achieved by employing the usual diffusing white screen. The problem of providing increased light intensity is thus solved not by any attempt to protect the film while increasing the light intensity and hence the heat content of the light source itself, but, instead, by employing standard light sources and achieving desired brightness by the provision of a screen whose reflective characteristics render the increase in intensity of light at the source unnecessary. Accordingly, screens up to twice the size of the standard prior art white diffusing screens may be employed without loss of apparent brightness of the picture. In fact, the use of the novel screens referred to, in sizes up to twice that of the prior art normal will enable the brightness of the picture to be improved over that of existing practices, even though the intensity of the light source is unchanged.

In view of the enlarged viewing angle and the extended scope of the projected image, it is also desirable to accompany the picture with sound coming from a multiplicity of sources, which may be defined as stereophonic sound. In the accompanying drawing three such sources are shown at 9, 10 and 11, evenly spaced about the scene being photographed. The invention contemplates the use of naturally interacting sound records, either on a separate recording medium synchronized to operate cooperatively with the picture transport mechanism, or, alternatively, provided as an integral part of, or mounted upon, the film band. This enables the reproduction of the sound at the projection end in correspondence with the pickup of the same at the photographing end. In FIGURES 3 and 4 of the accompanying drawing three such sound tracks are shown at 13, 14 and 15, and at 13', 14' and 15' applied to standard width film by using one in normal position alongside of the picture frames and within the line of the sprocket holes, while tracks 13 and 15 are in the portion of the film outside of the sprocket holes. Thus, sound coming from the projectors 16, 17 and 18 (FIGURE 5), will correspond respectively with the sound pickup at positions 9, 10 and 11.

Of the sound records shown in FIGURE 3, 13 and 15 are of the magnetic type, while 14 is of the variable density silver optical type commonly used in prior art sound motion pictures. This arrangement is shown merely for illustrative purposes, for alternately the tracks could be of different natures. A preferable alternative is that shown in FIGURE 4 where the sound tracks 13', 14' and 15' are all of the magnetic type. Finally, it is to be noted that a recording medium separate from the film may well be used, as already indicated, and regardless of the medium, the number of sound pickups and sound reproductions can be of the desired number and in the appropriate position to pick up the sound adequately at the scene being photographed and reproduce it adequately at the projection thereof.

The sections of standard width motion picture film shown in FIGURES 3 and 4 are capable of being used in the standard motion picture projectors presently being used with moderate additions of lens and sound equipment. As shown, however, the normal picture frames carry picture images capable of being projected on to a screen materially larger than presently employed. This is due to the picture images, such as 4 in FIGURES 3 and 4, having been compressed in one dimension in the taking, or printing, thereof. To provide realism of sound accompanying the illusion of realism achieved by such pictures the film also carries a plurality of mutually interacting sound records or tracks as shown at 13, 14 and 15 in FIGURE 3, and at 13', 14' and 15' in FIGURE 4. The provision of tracks 13 and 15, or 13' and 15', as the case may be, outside of the line of sprocket holes enables standard width film to be used.

As already indicated, the invention contemplates a change in the camera equipment used for the photographing of the scenes to the extent that an image of suitable size and of finally desired aspect ratio is recorded on film of the desired size without the necessity of any lateral compression of the image, though such camera equipment and special film would involve more expense than the mere conversion of existing cameras by the addition of an anamorphotic element. The expense as against the expense of making the pictures themselves, and as against the cost of converting existing projection equipment would be rather inconsequential. The results attainable warrant this procedure, aside from the more readily apparent advantage of reducing the visibility on the screen of the grain structure of the film. When the image is provided directly on film of larger frame size and this negative is compressed in one of the printing operations used in preparing the intermediate film to be employed for the making of release prints, the factor of grain structure appearing on the screen is materially reduced from what it would be were standard sized film used throughout.

Such a wider film frame is illustrated in FIGURE 2. There the image 3 retains the same aspect ratio as that of the scene being photographed, as illustrated in FIGURE 1. When film and camera equipment, capable of photographing an image as in FIGURE 2 are employed, means must be provided to compress that image on to standard width release positions for projection by means of standard projection equipment. Compression is effected in this instance by incorporating an anamorphotic lens component in the printing stage. Thus the image of FIGURE 2 is compressed principally in one dimension into the form shown in FIGURES 3 and 4.

Though the combination of features going together to make up invention has been described from the point of view of motion picture photography and projection, it is to be understood that the principles involved are equally applicable to the theatre television systems which depart from normal motion picture operations and proceed directly employing a separate light source, as in the Eidophor method. That method as described in pages 393 through 406 of the April 1950 Journal of the S.M.P.T.E., vol. 54, employs a control element which is a thin layer of viscous liquid. That element is mechanically deformed by the electron beam of the television system and the deformation corresponds to the image of a scene recorded on motion picture film when that film is exposed to the scene. The Eidophor control element is used in the enlarged projection of pictures on a screen by means of a separate light source which is directed on to the element and on leaving the same proceeds through a projection lens system. Such projection lens system, as well as the television camera, may be equipped with anamorphotic elements so that a picture occupying an enlarged screen, as above described, can readily be reproduced.

Though it is appreciated that certain of the elements or parts of the combination disclosed herein are known in the art, certain others of them are not so known, and furthermore, it has not heretofore been contemplated to use even the known features in combination, let alone the new and novel features in combination. Thus the invention contemplates new combinations embodying features providing a new and useful medium of entertainment not hitherto believed possible.

It is, of course, contemplated that changes may be made in the combinations above set forth and in parts thereof, as well as in the methods disclosed, all of which embody the invention and that such changes may be made without departing from the scope of the invention. It is, accordingly, intended that all matter contained in the above description, or shown in the accompanying drawing, shall be interpreted as illustrative and not in a limiting sense. The invention, accordingly, comprises the combinations of elements and arrangements of parts and the several steps and the relation and order of one, or more, of such steps with respect to each of the others thereof, the scope and application of which will be indicated in the following claims.

The invention claimed is:

1. In a system for projection of motion pictures involving an enhanced illusion of realism, a standard motion picture film formed with picture frames of substantially standard size thereon, each of said frames having an image of an enlarged object space recorded thereon and substantially fully occupying said frames, which images as recorded on said film and throughout the same are materially compressed in one and the same dimension, three sound tracks carried by the said film, each of said tracks having sound recorded thereon emanating from equally spaced positions across said object spaces the images of which object spaces are compressed as recorded on said frames, projection apparatus for projecting said images from said frames onto a screen, said apparatus including a single light source and means for expanding said compressed dimension of said recorded images to normal dimension in the projection thereof, a screen for receiving said projection, said screen being increased in size in one dimension as against the dimensions of normal motion picture screens in direct relationship to the degree of expansion provided by said expanding means to provide for the projected pictures having the same relative dimensions as those of the scenes imaged on said frames, said screen being curved horizontally throughout with a continuous concave curve on substantially the radius of the projection throw and said screen being formed with a highly reflective surface thereon to provide approximately the brightness obtainable on a normal size screen employing a comparable light source, and means for reproducing said sound from said sound tracks adjacent said screen at positions with respect to said projected picture corresponding to the positions at which sound emanating from the scene photographed was picked up.

2. A system as in claim 1, said sound tracks being magnetic, said screen being increased in size in its horizontal dimension and being formed with a multiplicity of minute highly reflective elements on the surface thereof.

References Cited in the file of this patent

UNITED STATES PATENTS

| | | |
|---|---|---|
| 1,032,172 | Zollinger | July 9, 1912 |
| 1,489,314 | De Forest | Apr. 8, 1924 |
| 1,591,081 | Curtis | July 6, 1926 |
| 1,781,550 | Kwartin | Nov. 11, 1930 |
| 1,825,529 | Koller | Sept. 29, 1931 |
| 1,829,633 | Chretien | Oct. 27, 1931 |
| 1,829,634 | Chretien | Oct. 27, 1931 |
| 1,918,488 | Rackett | July 18, 1933 |
| 1,938,808 | Ceccarini | Dec. 12, 1933 |
| 1,998,054 | McBurney | Apr. 16, 1935 |
| 2,006,233 | Chretien | June 25, 1935 |
| 2,060,817 | Mahoney | Nov. 17, 1936 |
| 2,077,702 | Land | Apr. 20, 1937 |
| 2,101,121 | Wixon | Dec. 7, 1937 |
| 2,280,206 | Waller et al. | Apr. 21, 1942 |
| 2,480,162 | Rath | Aug. 30, 1949 |

FOREIGN PATENTS

| | | |
|---|---|---|
| 343,512 | Great Britain | Feb. 16, 1931 |
| 389,434 | Great Britain | Mar. 16, 1933 |

OTHER REFERENCES

"Wide Screen Photography with Cylindrical Anamorphosing Systems and Characteristics of Motion Picture Lenses and Images," Newcomer, H. S., Journal of the Society of Motion Picture Engineers, vol. 20, No. 1, 1933, pages 31–53.